July 29, 1924. 1,502,943
W. G. DUNN
MOTOR SUPPORT
Filed June 16, 1921  2 Sheets-Sheet 1
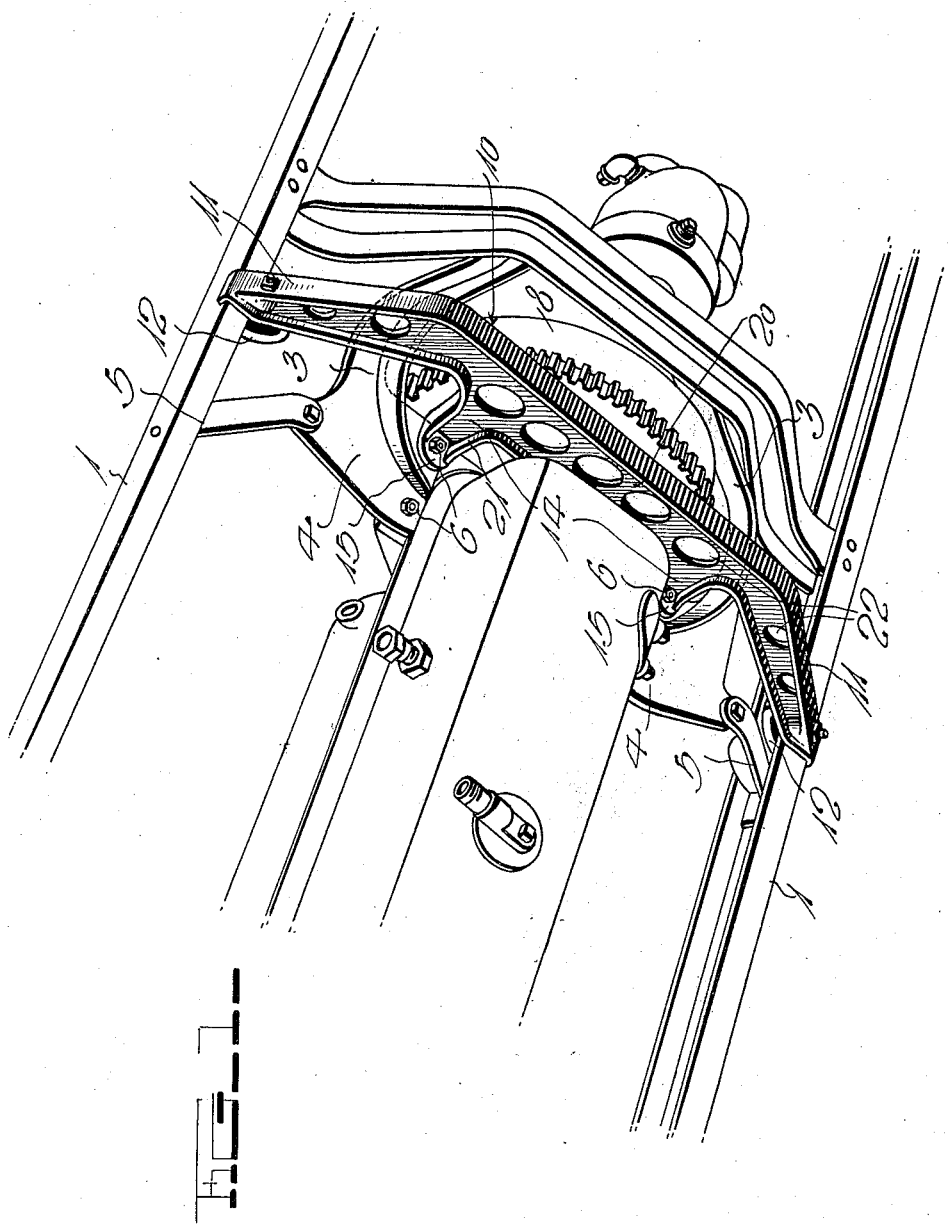
Witness
H. Woodard
Inventor
W. G. Dunn
By H. B. Wilson & Co.
Attorneys

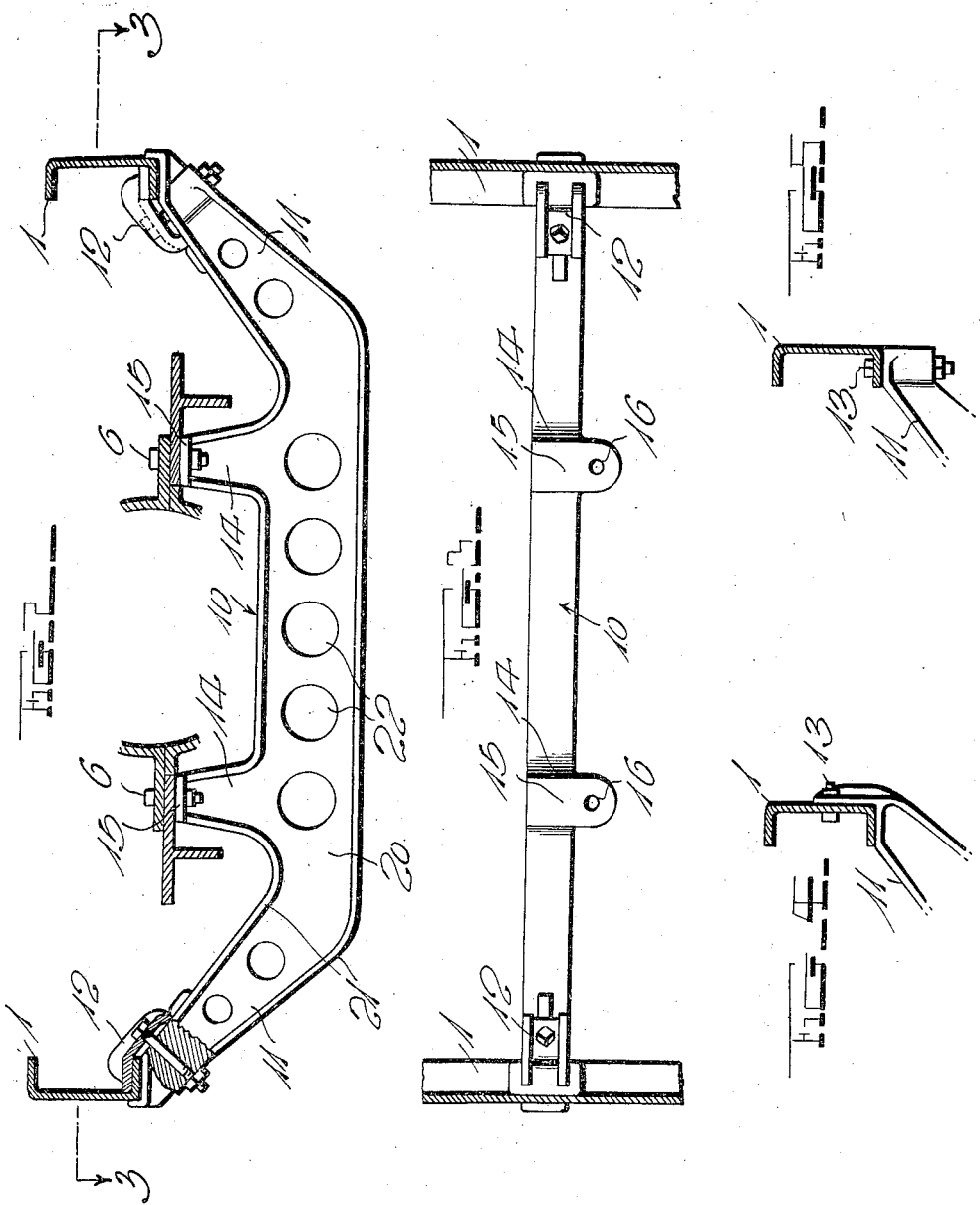

Patented July 29, 1924.

1,502,943

UNITED STATES PATENT OFFICE.

WILLIAM G. DUNN, OF CLARINDA, IOWA.

MOTOR SUPPORT.

Application filed June 16, 1921. Serial No. 478,086.

*To all whom it may concern:*

Be it known that I, WILLIAM G. DUNN, a citizen of the United States, residing at Clarinda, in the county of Page and State of Iowa, have invented certain new and useful Improvements in Motor Supports; and I do declare the following to be a full, clear, and exact description of the invention, such as will enable others skilled in the art to which it appertains to make and use the same.

My invention relates to improvements in auxiliary supports for automobile motors and more particularly to one designed primarily for use upon Model 4–90 Chevrolet. On machines of this type, the rear supporting brackets for the motor often permit the latter to sag thereby moving the fly wheel out of alinement with the clutch member and causing either slipping or grabbing of the clutch, with the well known detrimental results. The object of my invention however, is to provide an extremely simple and inexpensive, yet a highly efficient and reliable support for the rear end of the motor which will overcome previous objections, novel provision being preferably made whereby the device may be attached without necessitating any alterations in the construction of the machine.

Another object of the invention is to provide a motor support which is so constructed that it may be put in place without dismounting the motor, thereby permitting it to be used in connection with assembled cars as means for bracing a motor when the motor supporting arms break and further permitting it to be used as an attachment to prevent breaking of the brackets and sagging of the motor.

With the foregoing and minor objects in view, the invention resides in the novel construction and arrangement of parts hereinafter described and claimed, the descriptive matter being supplemented by the accompanying drawings.

Figure 1 is a perspective view of a portion of an automobile equipped with my invention.

Figure 2 is a transverse sectional view.

Figure 3 is a horizontal section as indicated by line 3—3 of Fig. 2.

Figures 4 and 5 are detail vertical sectional views, partly in elevation showing different ways of securing the support to the frame of the machine.

In the drawings above briefly described, the numerals 1 designate the parallel side bars of a chassis frame. The numeral 3 designates a pair of transmission supporting bracket arms, said bracket arms terminating in horizontal plate-like portions 4 whose outer edges are tied to the side bars by braces 5. By suitable bolts 6, the bracket ends 4 are secured to the rear end of the motor 7, the fly-wheel 8 of said motor being straddled by the brackets 3. The points at which the brackets 3 are connected with the motor 7, are so remote from the points at which said brackets are secured to the chassis frame, that the brackets very often sag and disaline the fly-wheel 8 and the usual movable clutch member, often producing very injurious effects on the transmission, differential and other parts of the machine. To overcome this difficulty, I have devised a novel form of auxiliary support, which, however, may in some instances be used as a major support, without the hangers or braces 5.

The support above mentioned is in the form of a metal bar 10 whose ends constitute rigid arms directed upwardly as indicated at 11, said ends being preferably disposed in upwardly diverging relation as shown. The ends 11 are suitably secured to the side bars 1 of the chassis frame, a pair of clamps 12 (Figs. 1, 2 and 3) being preferably employed for this purpose so that no openings need be drilled through the frame. If desired however the constructions shown in Figs. 4 and 5 may be used, it being then necessary however to pass bolts 13 through the side bars of the frame. This is not objectionable in some instances, but for general repair work, the clamps 12 are preferable.

At suitably spaced points, the bar 10 is provided with a pair of upwardly extending arms 14 which are preferably formed integrally therewith, the upper ends of said arms terminating in the form of flat horizontal plates 15 which extend laterally to some extent from said arms and are provided with bolt holes 16. These holes are so spaced as to receive the rearmost of the bolts 6 as shown clearly in Fig. 1, whereby to rigidly secure the brackets 3 and the rear portion of the motor to the supporting bar 10 which is in turn rigidly secured to the chassis frame.

In the preferred form of construction, illustrated in the present disclosure, the bar 10 by preference consists of a main vertical web 20 reinforced along its edges by ribs or flanges 21 and provided with appropriate openings 22 for sake of lightness. It is to be understood however that this exact construction need not be followed in all instances and in fact that numerous changes may be made within the scope of the invention as claimed.

Attention is directed to the fact that the supporting arms 5, previously used, have no tendency whatever to secure the transmission supporting bracket arms 3 in rigid relation with the motor. By the use of my invention, however, the front ends of these arms 3 are rigidly secured upon the improved cross member, whether it be of the exact design shown, or of other adequate shape, and the crank case of the motor is rigidly supported upon and secured to said arms 3. By thus rigidly securing the cross member, the arms 3 and the crank case together, said arms 3 are rigidly held against movement with respect to the crank case, and consequently, a great deal of trouble previously encountered, is overcome.

By employing the general construction shown, the device can be easily put in place and have its end portions secured to the chassis frame and its intermediate portions secured to the transmission supporting bracket arms 3. It only requires a short time to so apply the device and furthermore the application is an easy matter. It may here be stated however that in all instances, the invention need not be embodied in the form of an attachment, as if desired, it may be formed as a part of the chassis, at the factory.

I claim:

1. An automobile chassis having side bars, a motor between said side bars, transmission supporting bracket arms straddling the fly-wheel of the motor and having horizontal plate-like front ends at opposite sides of and secured to the motor crank case, a cross bar having a pair of rigid upstanding arms secured against the lower sides of said plate-like ends of the bracket arms, said cross bar having additional rigid arms projecting outwardly from the lower ends of said upstanding arms, said additional arms having their inner ends spaced downwardly from the upper ends of said upstanding arms to extend under said transmission supporting bracket arms, and means for rigidly securing the free ends of said additional arms to said side bars of the chassis.

2. An automobile motor support comprising a bar adapted to extend horizontally under a part of the motor, said bar having a pair of rigid upstanding arms adapted to support and be secured to transmission carrying brackets on the rear portion of the motor, said bar also having an additional pair of rigid arms projecting outwardly from the lower ends of said upstanding arms, said additional arms having their inner ends disposed in downwardly spaced relation with the upper ends of said upstanding arms for passage under the aforementioned brackets, the outer ends of said additional arms being adapted to be secured to the side bars of a chassis frame.

3. The combination with a chassis having side bars and transmission-supporting brackets, of an auxiliary motor-supporting cross bar having intermediate portions secured to said brackets and shaped between the bracket-engaging portions to extend under a part of the motor, the end portions of said cross bar being extended for engaging the underfaces of said side bars, attaching brackets engaging the upper faces of said side bars, and fastening bolts securing the attaching brackets and the ends of said cross bar in clamping engagement with said side bars.

4. The combination with a chassis having side bars and transmission-supporting brackets, of an auxiliary motor-supporting cross bar having intermediate portions secured to said brackets and shaped between the bracket-engaging portions to extend under a part of the motor, the end portions of said cross bar being extended for engaging the underfaces of said side bars, and means for firmly holding the ends of said cross bar in engagement with the underfaces of said side bars.

5. An automobile chassis having side bars, a cross member secured at its ends to said side bars, a pair of transversely spaced transmission-carrying arms disposed horizontally between said side bars and having their front ends rigidly secured on said cross member, and a motor supported at its rear end upon and secured to said transmission-carrying arms.

6. An automobile chassis having side bars, a motor between said side bars having a fly-wheel rearwardly spaced from its crank case, horizontal transmission supporting bracket arms straddling said fly-wheel and having their front ends disposed at opposite sides of and secured to said crank case, a cross member between the crank case and fly-wheel and secured rigidly at its ends to said side bars, and means rigidly securing said transmission-supporting bracket arms at their front ends to said cross member.

In testimony whereof I have hereunto set my hand.

WILLIAM G. DUNN.